US009810553B2

(12) United States Patent
Bondar

(10) Patent No.: US 9,810,553 B2
(45) Date of Patent: Nov. 7, 2017

(54) MEASUREMENT SYSTEM

(71) Applicant: Micronas GmbH, Freiburg (DE)

(72) Inventor: Yan Bondar, Waldkirch (DE)

(73) Assignee: TDK-Micronas GmbH, Freiburg (DE)

( * ) Notice: Subject to any disclaimer, the term of this patent is extended or adjusted under 35 U.S.C. 154(b) by 0 days.

(21) Appl. No.: 14/570,645

(22) Filed: Dec. 15, 2014

(65) Prior Publication Data

US 2015/0168124 A1 Jun. 18, 2015

(30) Foreign Application Priority Data

Dec. 13, 2013 (DE) .......... 10 2013 020 578

(51) Int. Cl.
| G01R 33/07 | (2006.01) |
| G01D 5/244 | (2006.01) |
| G01D 5/14 | (2006.01) |

(52) U.S. Cl.
CPC ......... G01D 5/24438 (2013.01); G01D 5/147 (2013.01)

(58) Field of Classification Search
CPC ......... G01R 33/07; G01R 33/09; G01R 33/02
See application file for complete search history.

(56) References Cited

U.S. PATENT DOCUMENTS

| 5,963,028 | A | 10/1999 | Engel et al. | |
| 6,232,771 | B1* | 5/2001 | Herden | G01D 5/145 |
| | | | | 324/207.2 |
| 6,448,761 | B1* | 9/2002 | Stumpe | G01D 5/145 |
| | | | | 324/207.2 |
| 7,227,353 | B2 | 6/2007 | Fukaya et al. | |
| 7,250,760 | B2 | 7/2007 | Ao | |
| 8,680,847 | B2 | 3/2014 | Franke et al. | |
| 2002/0167310 | A1 | 11/2002 | Wallner et al. | |
| 2003/0205998 | A1* | 11/2003 | Heremans | G01D 5/147 |
| | | | | 324/165 |
| 2012/0217960 | A1 | 8/2012 | Ausserlechner | |
| 2012/0319680 | A1* | 12/2012 | Ueda | G01D 5/2451 |
| | | | | 324/207.25 |

FOREIGN PATENT DOCUMENTS

| DE | 10 2004 041 559 A1 | 3/2005 |
| DE | 698 27 559 T2 | 12/2005 |
| DE | 10 2012 203 001 A1 | 8/2012 |
| EP | 1 014 039 A1 | 6/2000 |
| WO | WO 2010/060607 A2 | 6/2010 |

* cited by examiner

Primary Examiner — Jermele M Hollington
Assistant Examiner — Feba Pothen
(74) Attorney, Agent, or Firm — Muncy, Geissler, Olds & Lowe, P.C.

(57) ABSTRACT

A measurement system having a first magnetic field sensor and having a magnet for generating a magnetic field, in which the magnet has a first pole face and a second pole face, wherein an axis of rotation is defined perpendicular to the first pole face and perpendicular to the second pole face, wherein the magnet is supported for rotation about the axis of rotation, in which the first magnetic field sensor is positioned facing the first pole face and at a distance from the axis of rotation, in which the magnet has a rotational asymmetry of the flux density in the region of the first pole face, wherein the flux density of the magnet in the first magnetic field sensor can be adjusted between a maximum and a minimum by rotation of the magnet about the axis of rotation.

15 Claims, 4 Drawing Sheets

MEASUREMENT SYSTEM

This nonprovisional application claims priority under 35 U.S.C. §119(a) to German Patent Application No. 10 2013 020 578.6, which was filed in Germany on Dec. 13, 2013, and which is herein incorporated by reference.

BACKGROUND OF THE INVENTION

Field of the Invention

The present invention relates to a measurement system.

Description of the Background Art

Known from WO 2010/060607 A2, which corresponds to U.S. Pat. No. 8,680,847, which is incorporated herein by reference, is an IC package with a semiconductor chip with an integrated circuit and an integrated magnetic sensor. Spaced apart from the package of the semiconductor chip is a permanent magnet whose magnetic flux penetrates the sensor. If an object to be measured approaches the head end of the semiconductor chip, the magnetic flux density through the sensor changes.

Integrated magnetic Hall effect sensors in which a permanent magnet is incorporated into the IC package are known from U.S. Pat. No. 7,250,760 B2. In this design, the Hall effect sensors are arranged relative to the field of the permanent magnet in such a manner that a Hall voltage is generated without the influence of external fields.

Known from DE 698 27 559 T2, which corresponds to U.S. Pat. No. 5,963,028, is a package for a magnetic field sensor. Conventionally, an air gap is defined as the distance between the exciter and the outer surface of the package containing a measuring element of the magnetic field sensor. An "effective air gap" may be described as the distance between the exciter and the measuring element itself. Magnetic field sensors typically include a permanent magnet and a measuring element that is encapsulated in a package. However, this type of packaging is unsuited for harsh environments, particularly that of an automobile. Accordingly, such packaged measuring elements are further enclosed in an additional housing (overmold), which affords protection from moisture and dirt. This leads to a decrease in the peak magnetic field strength as a tooth passes through the magnetic field in proximity to the measuring element. In DE 698 27 559 T2, it is desirable to have the measuring element as close as possible to the magnet, since the magnetic field decreases as a function of the air gap. A short distance allows the use of a small magnet with a lower energy product.

A 3D magnetic sensor is known from DE 10 2012 203 001 A1, which corresponds to US 20120217960. The magnetic field sensor has a low-profile soft magnetic body arranged on a surface of a substrate that has a magnetic sensor array with a plurality of spatially diverse magnetic sensor elements that are arranged in a predetermined configuration. In the presence of an external magnetic field, the low-profile soft magnetic body is magnetized in order to generate a reactive magnetic field. The plurality of magnetic sensor elements are each configured to measure a magnetic field value of a superposition of the external magnetic field and the reactive magnetic field along a first axis (for example, a z-axis), resulting in a plurality of spatially diverse measurements of the magnetic field component along the first axis. The plurality of spatially diverse measurements can be used to calculate magnetic field components of the external magnetic field along a plurality of axes (for example, x-axis, y-axis, and z-axis).

SUMMARY OF THE INVENTION

It is therefore an object of the invention to improve a measurement system for measuring a magnetic field to the greatest degree possible.

Accordingly, a measurement system is provided that, in an embodiment, includes a first magnetic field sensor and a magnet for generating a magnetic field.

The magnet has a first pole face and a second pole face. An axis of rotation is defined perpendicular to the first pole face and perpendicular to the second pole face. The magnet is supported for rotation about the axis of rotation.

The first magnetic field sensor is positioned facing the first pole face and at a distance from the axis of rotation.

The magnet has a rotational asymmetry of the flux density in the region of the first pole face. Because of the rotational asymmetry, the flux density of the magnet in the first magnetic field sensor can be adjusted between a maximum and a minimum by rotation of the magnet about the axis of rotation.

A number of advantages are achieved through a practical implementation, such as is presented by way of example in the figure descriptions. Mechanical tolerances arising as a result of sensor component manufacture, sensor assembly, sensor mounting in the system, system component manufacture, system assembly, etc., can be compensated for at least partially by the adjustability between minimum and maximum. Wide scattering of a switching point of the sensor is significantly reduced by this means.

Especially magnetic field sensors that are not programmable can thus be used for a great many applications. Similarly, magnetic tolerances that arise in manufacture of the magnet due to suboptimal magnetization of the magnet, inhomogeneities of the magnet material, etc., can be compensated for. By the same token, technological tolerances in the manufacture of the magnetic field sensors, for example in the semiconductor process, can be compensated for. The adjustment is extremely simple here: by simply rotating the magnet, the switching point of the sensor in the overall system can be adjusted and the aforementioned tolerances can be compensated for at least partially.

In an embodiment, the first magnetic field sensor can have a first sensor element for measuring a first component of a flux density vector in a first spatial direction. Provision is advantageously made here for the first component to be adjustable by rotating the magnet between the maximum and minimum.

In an embodiment, a magnetization axis of the magnet can have an angle of 5° to 60° to the axis of rotation to produce the rotational asymmetry of the flux density.

In an embodiment, the magnet can have a shaped element. The shaped element can deviate inward or outward from an outer surface of the magnet in the region of the first pole face to produce the rotational asymmetry of the flux density.

In an embodiment, the magnet can have a cavity in an outer surface of the magnet in the region of the first pole face as the shaped element to produce the rotational asymmetry of the flux density.

In an embodiment, the magnet can have rotationally asymmetric outer dimensions as the shaped element in the region of the first pole face to produce the rotational asymmetry of the flux density.

In an embodiment, the magnet can have a cylindrical shape. An outer surface of the magnet is made symmetrical to the axis of rotation at least in the region of a second pole face. For example, the first pole face forms the magnetic north pole and the second pole face forms the magnetic south pole of the magnet.

In an embodiment, the measurement system can have a second magnetic field sensor. The second magnetic field sensor can face the first pole face and is positioned at the same distance from the axis of rotation as the first magnetic field sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
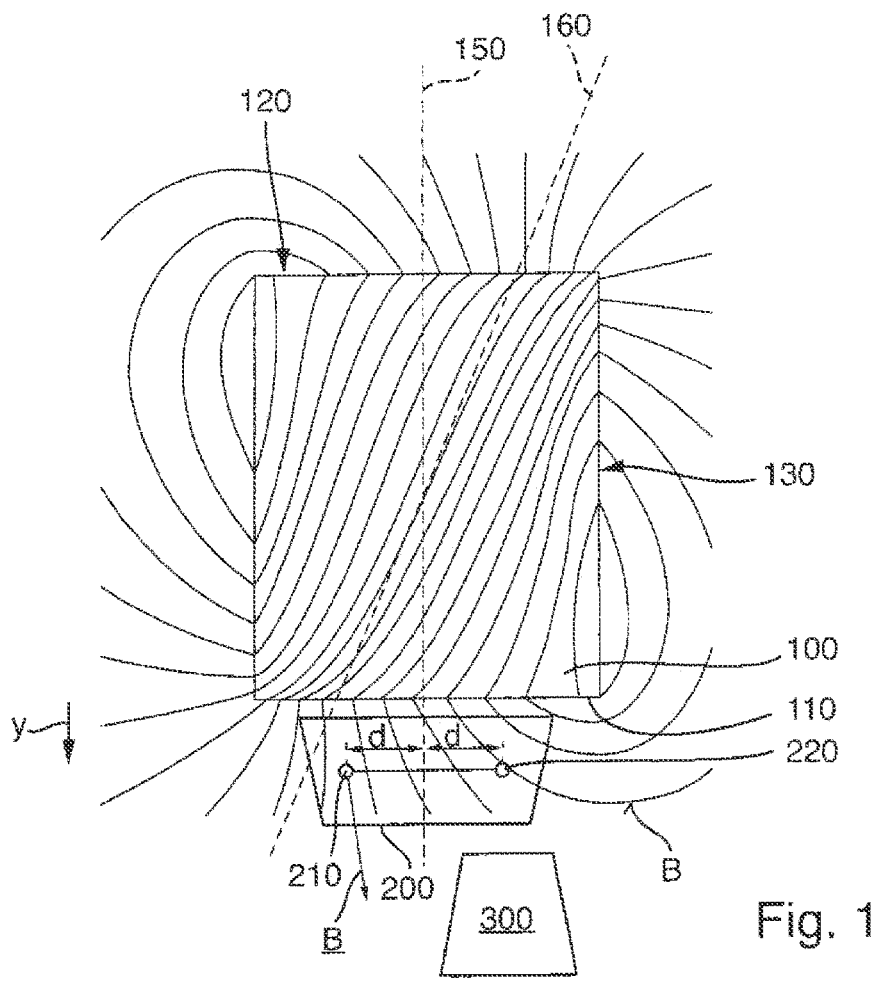
FIG. 1 is a schematic sectional view of a magnet/magnetic field sensor arrangement.

FIG. 1 shows a schematic sectional view in which a magnet 100, an IC package 200, and a detector 300 are shown in cross-section. Located in the IC package 200 are a first magnetic field sensor 210, for example a Hall effect sensor or a coil, and a second magnetic field sensor 220, for example likewise a Hall effect sensor or a coil.

In an embodiment from FIG. 1, an asymmetrically magnetized back bias magnet 100 is used for adjusting a switching point of the magnetic field sensor 210.

The measurement system has a sensor 210, 220 that is sensitive to magnetic fields, and has a magnet 100. The magnet 100 is located directly on one side of the magnetic field sensor 210. Located on the other side of the magnetic field sensor 210 is a detector 300, which can also be referred to as a target. Accordingly, the detector 300 is in front of the magnetic field sensor 210 and the magnet 100 is behind it, for example. The magnetic field sensor 210 is located in a package 200 together with another magnetic field sensor 220 and faces a first pole face 110 of the magnet 100.

In the embodiment from FIG. 1, a first magnetic field sensor 210 and a second magnetic field sensor 220 are located at the same distance d from an axis of rotation 150. Preferably, the first magnetic field sensor 210 and the second magnetic field sensor 220 are located on the same interconnect device or implemented in the same substrate (e.g., semiconductor substrate). The first magnetic field sensor 210 and the second magnetic field sensor 220 can be produced with the same production process.

The magnet 100 produces a magnetic field with the flux density B. Magnetic field lines of the magnet 100 are shown schematically in FIG. 1. The magnet 100 has a first pole face 110 and a second pole face 120. In an embodiment from FIG. 1, an axis of rotation 150 is defined perpendicular to the first pole face 110 and perpendicular to the second pole face 120. In an embodiment from FIG. 1, the magnet 100 has the shape of a cylinder.

The magnet 100 is supported for rotation about the axis of rotation 150. For a simplified depiction, a bearing for the rotation of the magnet 100 about the axis of rotation 150 is not shown in FIG. 1. A plain bearing, e.g. in the form of a hollow cylinder, can be provided as the bearing, for example. In advantageous fashion, an outer surface 130 of the magnet 100 is made symmetrical with regard to the axis of rotation 150. Preferably, the package 200 with the magnetic field sensors 210, 220 is rotationally fixed, for example is glued or soldered to an interconnect device. In this design, the magnet 300 can be rotated relative to the package 200.

The magnet 100 has a rotational asymmetry of the flux density B in the region of the first pole face 110. The flux density B in the region of the first magnetic field sensor 210 can be adjusted by rotating the magnet 100 about the axis of rotation 150. In an embodiment from FIG. 1, a magnetization axis 160 of the magnet 100 has an angle β of 5° to 60° to the axis of rotation 150. Accordingly, the magnetization axis 160 of the magnet 100 forms the angle β with the axis of rotation 150.

The measurement system changes its initial state when a differential flux density of a magnetic field is measured between the first magnetic field sensor 210 and the second magnetic field sensor 220, so that the flux density at the first magnetic field sensor 210 is greater than that at the second magnetic field sensor 220. This difference in the flux density B can be adjusted by rotating the magnet 100 about the axis of rotation 150.

Figure 2:
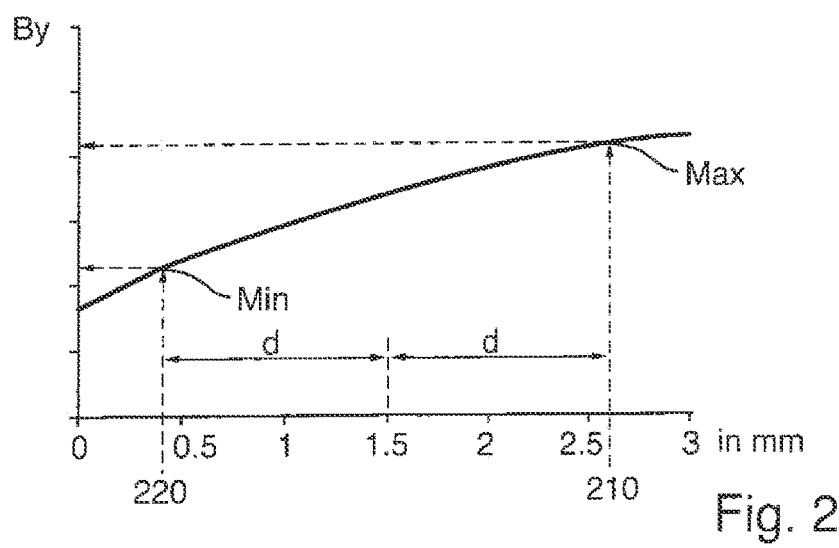
FIG. 2 is a schematic diagram.

FIG. 2 shows a schematic diagram associated with FIG. 1. Shown is a component $B_\gamma$ of the flux density B in the spatial direction γ according to the orientation in FIG. 1. FIG. 2 shows the curve of the component $B_\gamma$ of the flux density B along a reference line that intersects the axis of rotation 150 at a perpendicular. The reference line also intersects the first magnetic field sensor 210 and the second magnetic field sensor 220, which are located at the same distance d (approximately 1.2 mm) from the axis of rotation 150 at 1.5 mm.

Although it is possible to provide magnetic field sensors that can determine flux densities of magnetic fields in two or more spatial directions, provision is made in an embodiment according to FIG. 1 that the first magnetic field sensor 210 has a first sensor element for measuring a first component $B_\gamma$ of a flux density vector B in a first spatial direction γ and the second magnetic field sensor 220 has a second sensor element for measuring the first component $B_\gamma$ of the flux density vector B in the first spatial direction γ. Accordingly, the first component $B_\gamma$ can be adjusted between the maximum Max and the minimum Min. In the case shown in FIG. 2, the minimum Min of the flux density component $B_\gamma$ has just been established in the second magnetic field sensor 220, and the maximum Max in the first magnetic field sensor 210.

Figure 3:
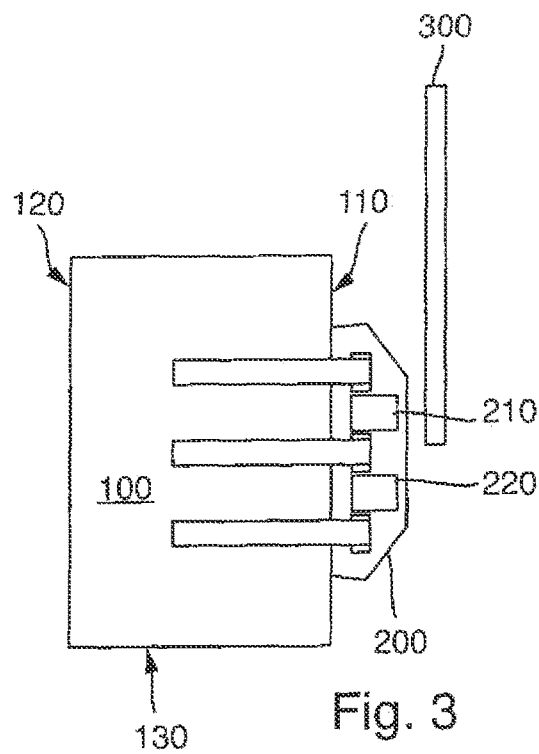
FIG. 3 is a first schematic view of a magnet/magnetic field sensor arrangement.
Figure 4:
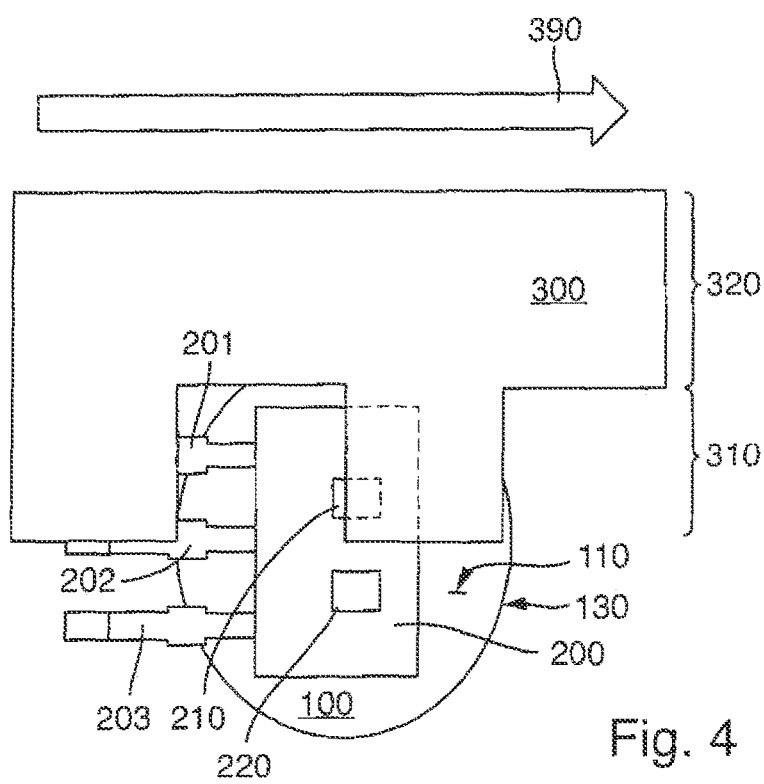
FIG. 4 is a second schematic view of a magnet/magnetic field sensor arrangement.

FIGS. 3 and 4 schematically show views of an embodiment of a measurement system. The package 200 with the magnetic field sensors 210, 220 is located between the magnet 100 and the detector 300. Three terminals 201, 202, 203 are led out of the package 200. While the package 200 is mounted in a stationary manner, the magnet 100 is supported so as to be rotatable relative to the package 200. FIG. 4 shows a top view of the detector 300 with the two regions 310, 320, wherein the region 310 has a shape for functioning as an incremental encoder. Also shown is the direction of motion 390 of the detector 300. The package 200 is located below the detector 300, and the magnet 100 is located below the package 200.

Figure 5:
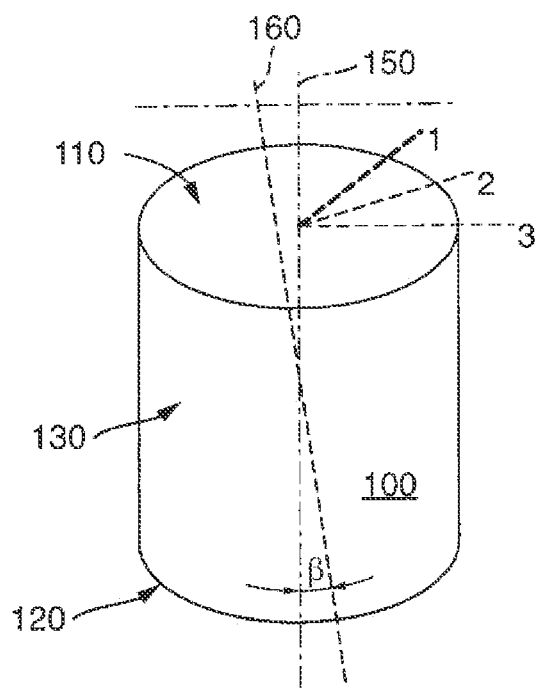
FIG. 5 is a schematic view of a magnet.
Figure 6:
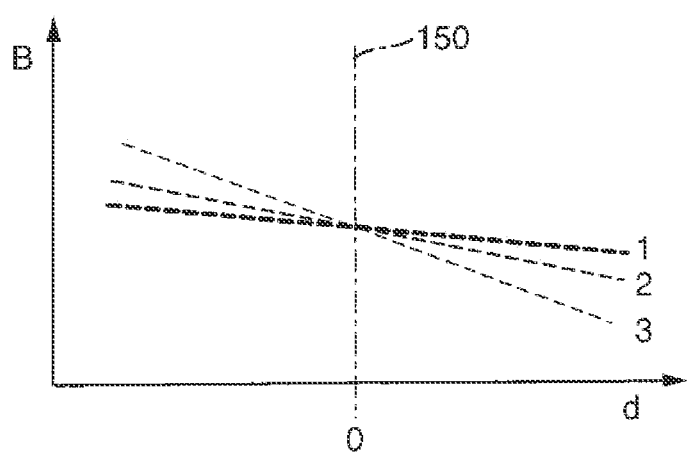
FIG. 6 is another schematic diagram.

An embodiment with an inclined magnetization of a cylindrical magnet 100 is explained in detail in FIGS. 5 and 6. The magnet 100 has a first pole face 110, a second pole face 120, and an outer surface 130. An axis of rotation 150 of the magnet 100 and an axis of magnetization 160 of the magnet 100 are shown. Due to an angle β between the axis of rotation 150 and the axis of magnetization 160, the measured flux density B is different for each of the magnetic field sensors 210, 220. The flux density B rises along a line 1, 2, 3 through the magnetic field sensors 210, 220. Segments of three lines 1, 2, 3 are shown schematically in the embodiment in FIG. 5.

If the magnet 100 is rotated about its own axis of rotation 150, the slope changes between a minimum and a maximum slope value. This is shown schematically in the diagram from FIG. 6. The value of the flux density B increases with the distance d toward the right from the axis of rotation 150 and decreases toward the left. In this diagram, the line 1 shows the smallest slope value, and the line 3 shows the largest slope value. If the magnet 100 is rotated about its own axis of rotation, the slope value changes such that for a specific rotational position of the detector 300 located opposite (see FIG. 1), the predefined flux density difference is established, which permits the measurement system to change the initial state. The maximum slope value can be specified easily in the magnetization process by means of the angle β between the axis of rotation 150 and the axis of magnetization 160.

Figure 7:
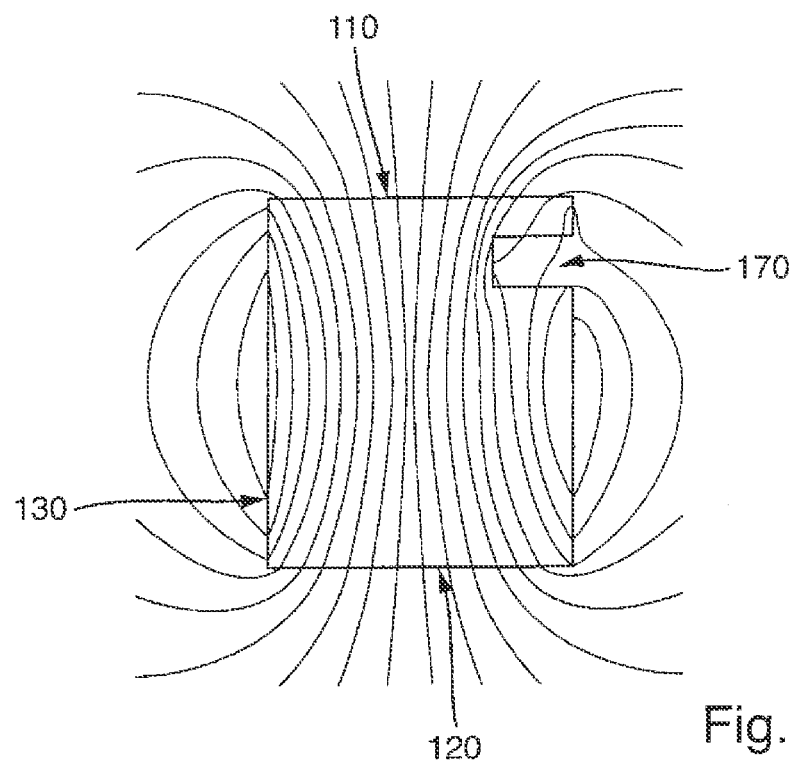
FIG. 7 is another schematic view of a magnet.
Figure 8:
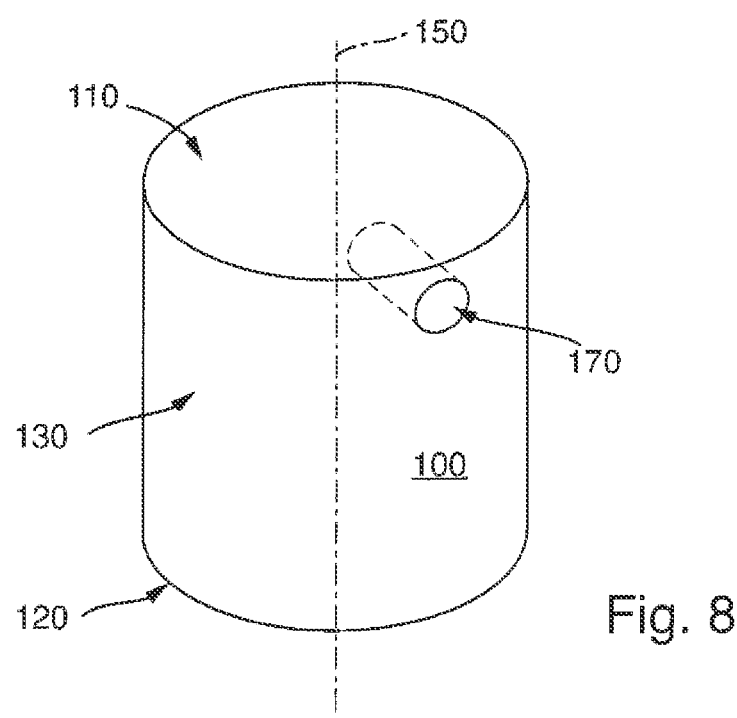
FIG. 8 is another schematic view of a magnet.

FIGS. 7 and 8 schematically show views of another embodiment of a magnet 100 with rotational asymmetry. FIG. 8 shows a cylindrical magnet 100 with a cavity 170. The cavity 170 can be produced by drilling or in the sintering process, for example. In this design, the cavity 170 is implemented in the outer surface 130 in the region of the first pole face 110. The cavity 170 extends only to a depth that is less than or equal to a radius of the magnet 100. The cavity 170 causes a desired disruption of the homogeneity of the magnetic field in the magnet 100, which affects the field distribution and thus also the local flux density B, and causes a rotational asymmetry of the flux density B. The magnetic field lines created by the magnet 100 with the cavity 170 are shown schematically in FIG. 7.

The invention is not limited to the variant embodiments shown in FIGS. 1 to 8. For example, it is possible to generate the homogeneity of the magnetic field, and thus the rotational asymmetry of the flux density, using a different shape of the magnet. The magnet can have a formation projecting out of the outer surface in the region of the first pole face to produce the rotational asymmetry, for example.

The functionality of adjusting the flux density in the region of the magnetic field sensors by simple rotation of the magnet can take place to especially good advantage at the end of the manufacturing process (EOL, End Of Line). This permits simple adjustment of the switching point in non-programmable measurement systems, for example when the measurement system must distinguish between two states of an incremental encoder.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measurement system comprising:
   a first magnetic field sensor; and
   a magnet for generating a magnetic field, the magnet having a first pole face extending over a first plane and a second pole face extending over a second plane,
   wherein the first plane is parallel to the second plane,
   wherein an axis of rotation is substantially perpendicular to the first pole face and substantially perpendicular to the second pole face,
   wherein the magnet is supported for rotation about the axis of rotation,
   wherein the first magnetic field sensor is arranged facing the first pole face and at a distance from the axis of rotation, and
   wherein the magnet has a asymmetry of the flux density about the axis of rotation in a region of the first pole face so that the flux density of the magnet in the first magnetic field sensor is adjustable between a maximum and a minimum by rotation of the magnet about the axis of rotation.

2. The measurement system according to claim 1, wherein the first magnetic field sensor has a first sensor element for measuring a first component of one flux density vector in a first spatial direction so that the first component is adjustable between the maximum and minimum.

3. The measurement system according to claim 1, wherein a magnetization axis of the magnet has an angle of 5° to 60° to the axis of rotation to produce the asymmetry of the flux density about the axis of rotation.

4. The measurement system according to claim 1, wherein the magnet has a shaped element that deviates from an outer surface of the magnet in the region of the first pole face to produce the asymmetry of the flux density about the axis of rotation.

5. The measurement system according to claim 4, wherein the magnet has a cavity in an outer surface of the magnet in the region of the first pole face as the shaped element to produce the asymmetry of the flux density about the axis of rotation.

6. The measurement system according to claim 4, wherein the magnet has rotationally asymmetric outer dimensions as the shaped element in a region of the first pole face to produce the asymmetry of the flux density about the axis of rotation.

7. The measurement system according to claim 1, wherein the magnet has a cylindrical shape, and an outer surface of the magnet is made symmetrical about the axis of rotation at least in the region of a second pole face.

8. The measurement system according to claim 1, further comprising a second magnetic field sensor, wherein the second magnetic field sensor faces the first pole face and is positioned at a same distance from the axis of rotation as the first magnetic field sensor.

9. A measurement system comprising:
   a first magnetic field sensor; and
   a magnet for generating a magnetic field, the magnet having a first pole face extending in a first direction and a second direction and a second pole face extending in the first direction and the second direction,
   wherein the first direction is substantially perpendicular to the second direction, wherein an axis of rotation in a third direction is substantially perpendicular to the first pole face and substantially perpendicular to the second pole face, wherein the magnet is supported for rotation about the axis of rotation, wherein the first magnetic field sensor is arranged facing the first pole face and at a distance from the axis of rotation, and wherein the magnet has an asymmetric flux density about the axis of rotation over the first pole face so that the flux density of the magnet in the first magnetic field sensor is adjustable between a maximum and a minimum by rotation of the magnet about the axis of rotation.

10. The measurement system of claim 9, further comprising: a second magnetic field sensor in a same plane as the first magnetic field sensor, wherein the first magnetic field sensor and the second magnetic field sensor are disposed on opposite sides of the axis of rotation along the first pole face of the magnet.

11. The measurement system of claim 10, wherein the first magnetic field sensor detects the maximum of the flux density and the second magnetic field sensor detects the minimum of the flux density at a first position of the magnet.

12. The measurement system of claim 10, wherein a toothed encoder is disposed adjacent to the first pole face of the magnet.

13. The measurement system of claim 9, wherein the magnet is cylindrical, wherein a blind hole is disposed in an outer surface of the magnet, and wherein the blind hole is closer to the second pole face than the first pole face.

14. The measurement system of claim 13, wherein the blind hole is cylindrical with a central axis intersecting the axis of rotation of the magnet, and wherein the central axis is perpendicular to the axis of rotation.

15. The measurement system of claim 1, further comprising: a second magnetic field sensor in a same plane as the first magnetic field sensor, wherein the second magnetic field sensor is arranged facing the first pole face and at the distance from the axis of rotation, and wherein the first magnetic field sensor and the second magnetic field sensor are disposed on opposite sides of the axis of rotation.

\* \* \* \* \*